US 12,166,825 B2

United States Patent
Parla

(10) Patent No.: US 12,166,825 B2
(45) Date of Patent: Dec. 10, 2024

(54) TELEMETRY OVER QUIC

(71) Applicant: Cisco Technology, Inc., San Jose, CA (US)

(72) Inventor: Vincent E. Parla, North Hampton, NH (US)

(73) Assignee: Cisco Technology, Inc., San Jose, CA (US)

(*) Notice: Subject to any disclaimer, the term of this patent is extended or adjusted under 35 U.S.C. 154(b) by 1 day.

(21) Appl. No.: 17/895,368

(22) Filed: Aug. 25, 2022

(65) Prior Publication Data
US 2024/0073284 A1   Feb. 29, 2024

(51) Int. Cl.
*H04L 67/133* (2022.01)
*H04L 67/02* (2022.01)
*H04L 67/56* (2022.01)

(52) U.S. Cl.
CPC ............ *H04L 67/133* (2022.05); *H04L 67/02* (2013.01); *H04L 67/56* (2022.05)

(58) Field of Classification Search
CPC ........ H04L 67/02; H04L 67/133; H04L 67/56
See application file for complete search history.

(56) References Cited

U.S. PATENT DOCUMENTS

| | | | |
|---|---|---|---|
| 11,018,959 B1* | 5/2021 | Neill | ..................... H04L 43/026 |
| 2019/0199619 A1 | 6/2019 | Kucera et al. | |
| 2019/0229903 A1* | 7/2019 | Balasubramanian | ........................ H04L 9/0631 |
| 2020/0359264 A1 | 11/2020 | Rácz et al. | |
| 2021/0409447 A1 | 12/2021 | Dutta | |
| 2023/0116449 A1* | 4/2023 | Qu | ........................ H04L 69/164 709/224 |
| 2023/0370435 A1* | 11/2023 | Galime | ............... H04L 63/0428 |

FOREIGN PATENT DOCUMENTS

| | | |
|---|---|---|
| EP | 3 820 088 A1 | 12/2021 |
| WO | 2021163684 A1 | 8/2021 |

OTHER PUBLICATIONS

T. Najaryan et al., "OpenTelemetry Protocol Specification", https://github.com/open-telemetry/opentelemetry-specification/blob/main/specification/protocol/otlp.md, printed May 18, 2022, 14 pages.

(Continued)

*Primary Examiner* — Gil H. Lee
(74) *Attorney, Agent, or Firm* — BEHMKE INNOVATION GROUP LLC; James M. Behmke; James J. Wong

(57) ABSTRACT

In one embodiment, an illustrative method herein may comprise: obtaining, by a device, one or more independent telemetry streams, wherein each of the one or more independent telemetry streams is uniquely identifiable by a span identifier; translating, by the device, each of the one or more independent telemetry streams into a corresponding QUIC protocol stream; mapping, by the device, the span identifier of each of the one or more independent telemetry streams to a respective stream identifier that uniquely identifies a QUIC channel of a multiplexed QUIC protocol stream; and communicating, by the device, the multiplexed QUIC protocol stream containing each of the one or more independent telemetry streams on its corresponding QUIC channel to cause a retrieving device to determine the span identifier of each of the one or more independent telemetry streams based on their respective stream identifier.

19 Claims, 12 Drawing Sheets

(56) References Cited

OTHER PUBLICATIONS

P. Chalin et al., "OpenTelemetry: Documentation", https://opentelemetry.io/docs/, printed May 18, 2022, 2 pages.
T. Najaryan et al., "OTLP/HTTP: HTTP Transport Extension for OTLP", https://github.com/open-telemetry/oteps/blob/main/text/0099-otlp-http.md#parallel-connections, printed May 18, 2022, 5 pages.
"TCP head of line blocking", https://http3-explained.haxx.se/en/why-quic/why-tcphol, printed May 18, 2022, 2 pages.
"QUIC, a multiplexed transport over UDP", The Chromium Projects, https://www.chromium.org/quic/, printed May 18, 2022, 2 pages.

\* cited by examiner

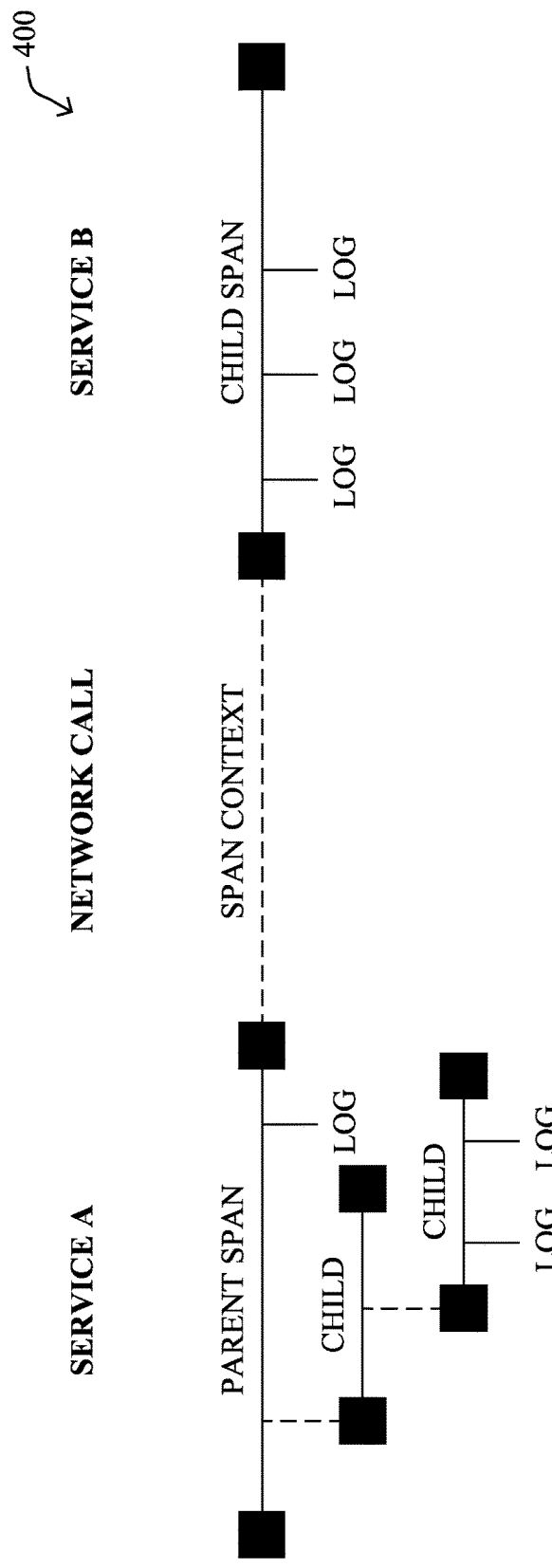

1. Trace: The description of a transaction as it moves through a distributed system.

2. Span: A named, timed operation representing a piece of the workflow. Spans accept key:value tags as well as fine-grained, timestamped, structured logs attached to the particular span instance.

3. Span context: Trace information that accompanies the distributed transaction, including when it passes the service to service over the network or through a message bus. The span context contains the trace identifier, span identifier, and any other data that the tracing system needs to propagate to the downstream service.

FIG. 4

TELEMETRY OVER QUIC

TECHNICAL FIELD

The present disclosure relates generally to computer systems, and, more particularly, to telemetry over QUIC.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect. As such, observability of telemetry data (e.g., logs, metrics, traces, etc.) for services is of increasing importance. An application can be instrumented to emit, as it executes, the telemetry data as telemetry data streams.

Notably, OpenTelemetry protocol offers a framework for generating, collecting, and/or transmitting the telemetry data streams. OpenTelemetry currently supports two mechanisms for data transport: a remote call procedure (RPC) mechanism OTLP/gRPC (The default network port for OTLP/gRPC is 4317) and a hypertext transfer protocol (HTTP) mechanism OTLP/HTTP (HTTP/1 or HTTP/2 via POST). Presently, OpenTelemetry is configured to utilize multiple parallel HTTP connections to provide sufficient throughput. Utilizing multiple parallel HTTP connections adds additional setup overhead and can fall victim to head of line blocking when processing records.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example of a distributed transaction;

DESCRIPTION OF EXAMPLE EMBODIMENTS

Overview

Figure 1:
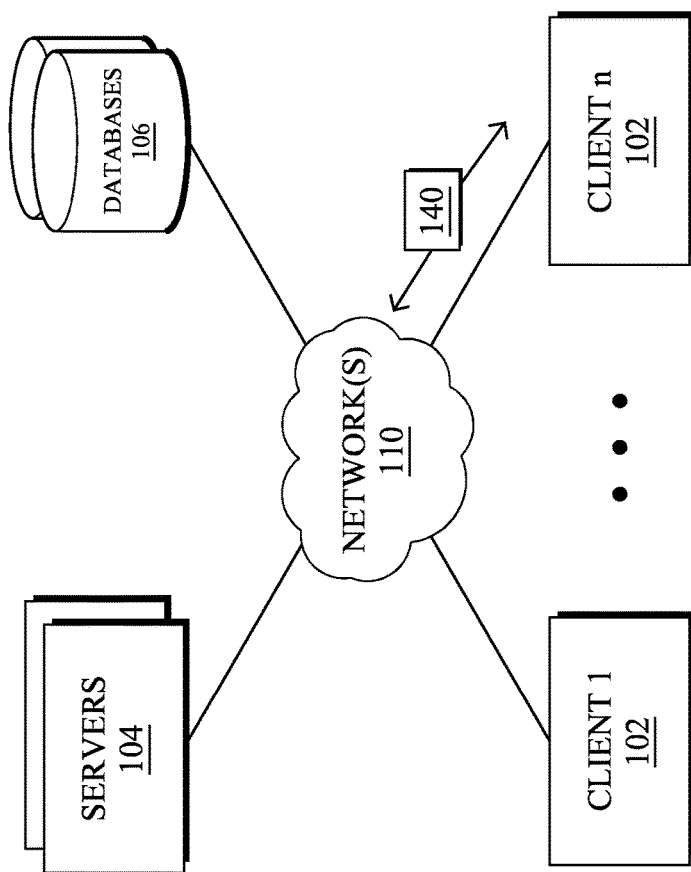
FIG. 1 illustrates an example computer network.

According to one or more embodiments of the disclosure, an illustrative method herein may comprise: obtaining, by a device, one or more independent telemetry streams, wherein each of the one or more independent telemetry streams is uniquely identifiable by a span identifier; translating, by the device, each of the one or more independent telemetry streams into a corresponding QUIC protocol stream; mapping, by the device, the span identifier of each of the one or more independent telemetry streams to a respective stream identifier that uniquely identifies a QUIC channel of a multiplexed QUIC protocol stream; and communicating, by the device, the multiplexed QUIC protocol stream containing each of the one or more independent telemetry streams on its corresponding QUIC channel to cause a retrieving device to determine the span identifier of each of the one or more independent telemetry streams based on their respective stream identifier.

Another illustrative method herein may comprise: receiving, by a retrieving device, a multiplexed QUIC protocol stream having a plurality of QUIC channels; determining, by the retrieving device, that the multiplexed QUIC protocol stream is a communication of independent telemetry streams; determining, by the retrieving device and based on a correlation between a respective stream identifier of each of the plurality of QUIC channels and a span identifier of a corresponding independent telemetry stream, an independent telemetry stream communicated within a QUIC channel of the multiplexed QUIC protocol stream; and consuming, by the retrieving device, the independent telemetry stream with its span identifier.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
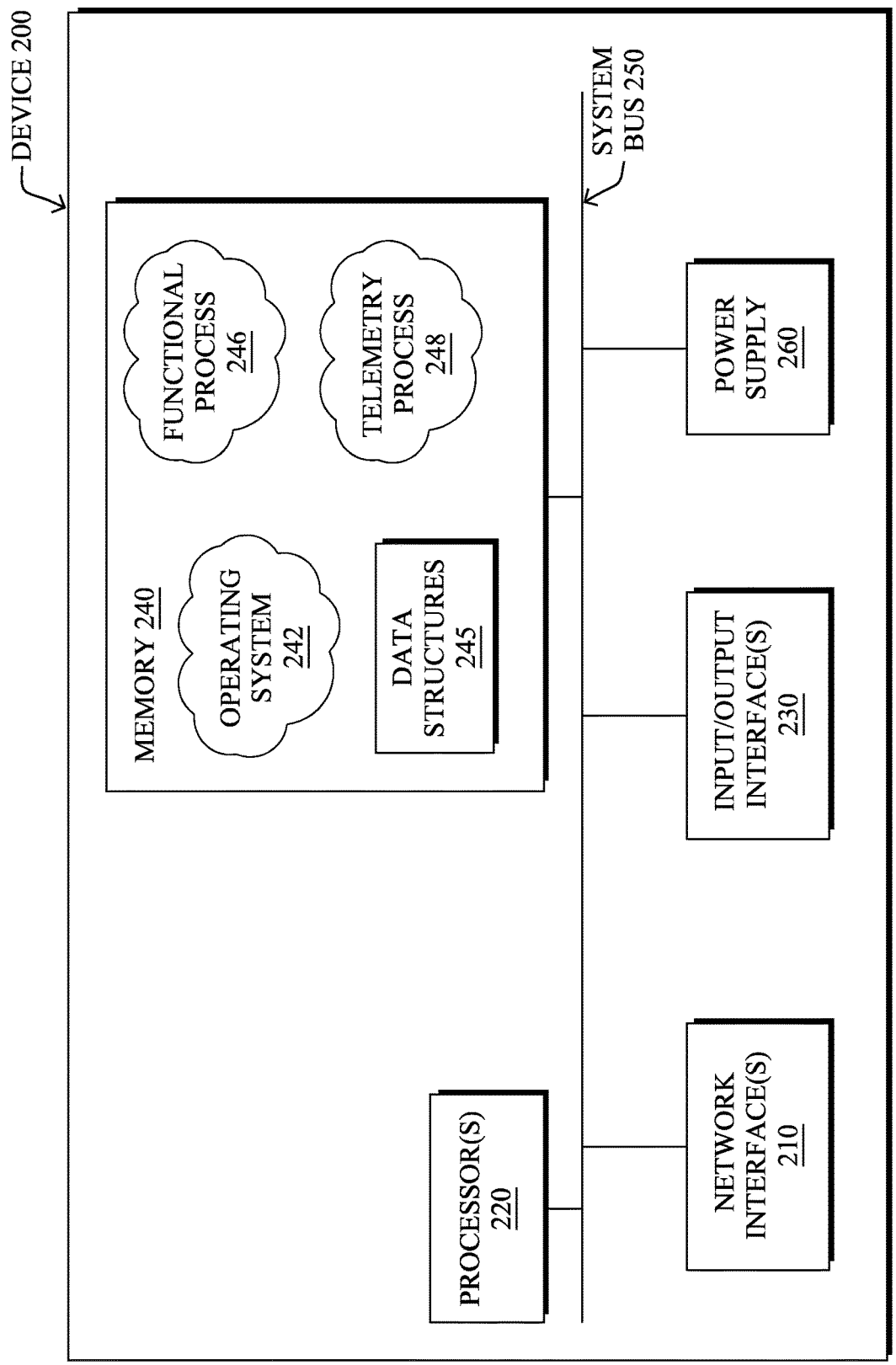
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "telemetry" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
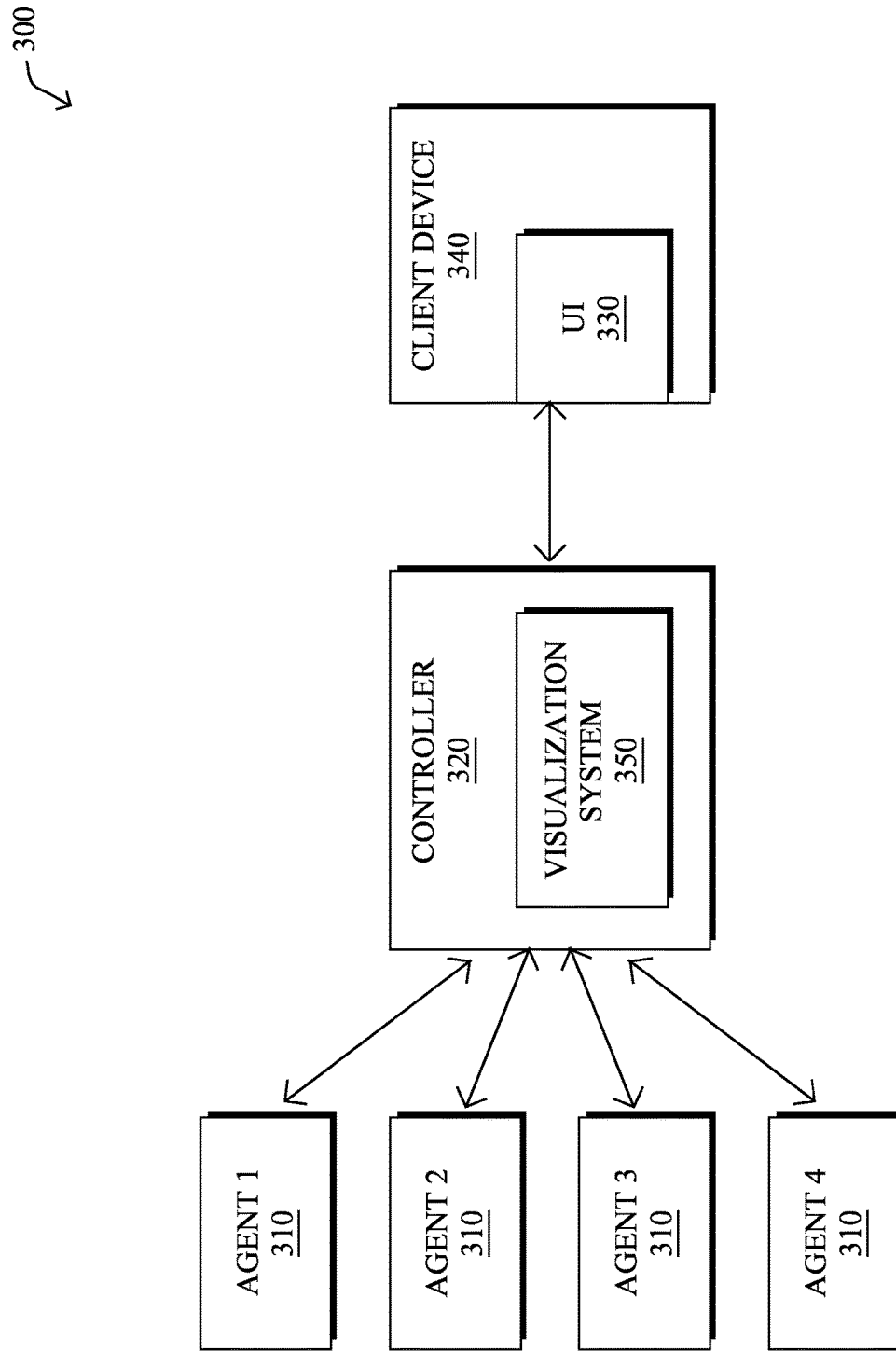
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—OpenTelemetry—

As noted above, OpenTelemetry represents a massive shift from proprietary application monitoring systems, such as application performance monitoring (APM) solutions, to an infrastructure that leverages application programming interfaces (APIs) that are standardized and open. OpenTelemetry is also quickly becoming an important cornerstone of the Cloud Native Computing Foundation.

In general, OpenTelemetry is the merging of OpenTracing and OpenCensus, which are two different open source standards projects which conflicted with each other. Essentially, the 'merged' technology of OpenTelemetry is focused on 'Cloud Native Computing' environments and is now part of the Cloud Native Computing Foundation (CNCF). OpenTelemetry represents a huge paradigm shift for Application Monitoring and specifically Application Tracing. By far the most popular and heavily supported platform for OpenTelemetry is Java.

To better illustrate the teachings herein, the following terminology is used:

Trace: a record of activity for a request through a distributed system. A trace is often represented as a Directed Acyclic Graph (DAG) of spans.

Spans: named, timed operations representing a single operation within a trace (e.g., a piece of the workflow). Spans can be nested to form a trace tree. Each trace contains a root span, which typically describes the end-to-end latency and (optionally) one or more sub-spans for its sub-operations. Spans also accept key:value tags as well as fine-grained, timestamped, structured logs attached to a particular span instance.

Metrics: a raw measurement about a service that are captured at runtime. OpenTelemetry defines three metric instruments: counter, measure, and observer. An observer supports an asynchronous API collecting metric data on-demand, once per collection interval.

Span Context: a span includes a span context, which is a set of globally unique identifiers that represent the unique request to which each span belongs, representing the data required for moving trace information across service boundaries. Said differently, a span context includes trace information that accompanies a distributed transaction, including when it passes the service to service over the network or through a message bus. Typically, a span context includes the trace identifier, span identifier, and any other data that the tracing system needs to propagate to the downstream service. OpenTelemetry also supports the correlation context which can carry any user-defined properties. A correlation context is not required, and components may choose not to carry or store this information.

Context Propagation: the means by which context is bundled and transferred between services, typically via HTTP headers. Context propagation is a key part of the OpenTelemetry system, and has some interesting use cases beyond tracing, such as for A/B testing. Note that OpenTelemetry supports multiple protocols for context propagation and to avoid issues, it is important that a single method be used throughout an application. So, for instance, if the W3C specification is used in one service, it should be used throughout the complete system. These are the currently supported options:

W3C Trace-Context HTTP Propagator
W3C Correlation-Context HTTP Propagator
B3 Zipkin HTTP Propagator FIG. 4 illustrates an example of a distributed transaction 400, according to various embodiments. As shown, assume that distributed transaction 400 begins at a first service, Service A, and is handed off via a network call to a second service, Service B, as time progresses. In such a case, tracing distributed transaction 400 using OpenTelemetry will result in a parent span for the execution of distributed transaction 400 by Service A that spans several child spans. In addition, the network call to pass distributed transaction 400 to Service B will also result in a span context. This allows the tracing of distributed transaction 400 to continue as a child span of the parent span that began at Service A.

OpenTelemetry is generally focused on application performance and not on security. More specifically, OpenTelemetry seeks to merge the tracing, metrics, and logging functions from OpenTracing and OpenCensus into a single, cohesive package under the CNCF. In this context, (distributed) tracing provides insight into the full lifecycles (e.g., traces) of requests to the system, allowing failures and performance issues to be identified. Metrics provide quantitative information regarding executed processes of the system, such as gauges, histograms, and counters. Logging, in turn, provides insight into messages sent by processes that are application-specific. These three functions are also often interrelated. For instance, a subset of misbehaving traces can be identified by looking at metrics. Similarly, analysis of the logs can reveal the root cause of the behavior. New metrics can also be introduced to identify the issue earlier in time.

Figure 5:
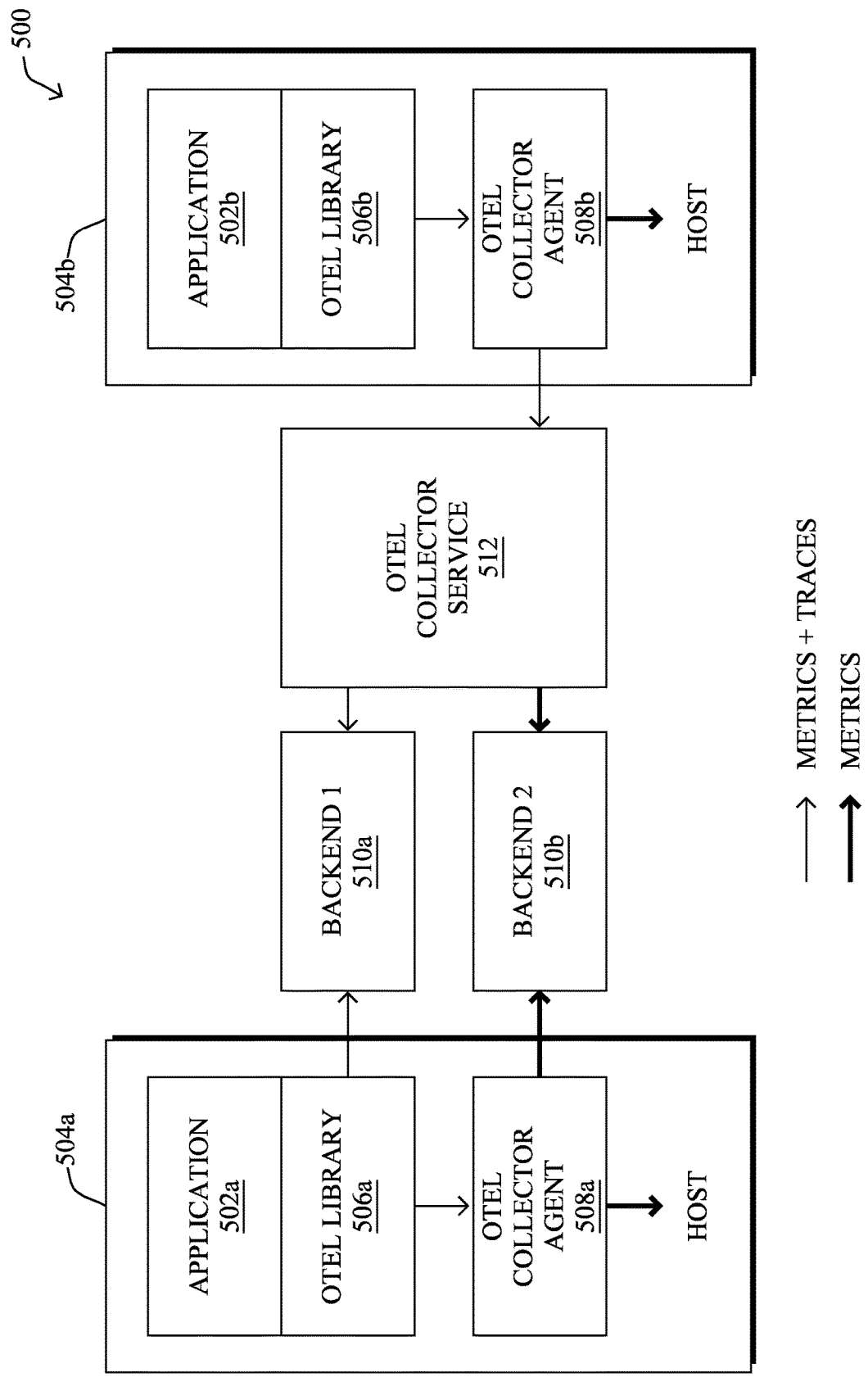
FIG. 5 illustrates an example of an OpenTelemetry architecture.

FIG. 5 illustrates an example of an OpenTelemetry architecture 500, according to various embodiments. Architecture 500 may utilize the specialized OpenTelemetry protocol for collecting and/or exporting this telemetry data from an application 502 to a target system. As described above, the telemetry data may include logs, metrics, traces, etc.

Logs may include text-format recordings of application events. When recorded by OpenTelemetry instrumentation, logs may be used to audit events. As such, any traceable event that happens to an observed application 502 may have a time stamp and an account labeled as the actor. Log classification may include info, error, and warning logs. Logs may be classified and labelled based on the severity of events, with critical being the highest level.

Metrics may include measurable events. For example, a metric may include a request load time, which measures how long a client query takes to return a result. When recorded, metrics may have a label, which serves to identify an event, along with metadata such as when the observation occurred as well as its duration. Metric data may include instruments such as measure (e.g., value adding up each time an event occurs, such as the number of hours an application experiences downtime), counter (e.g., accumulated recording of any particular metric pertaining to an application that, once recorded, every other occurrence increments the initial value, such as the uptime duration of an application from the day it was launched), observer (e.g., a static representation of a metric value, such as how much RAM an application is consuming at the moment of observation), etc.

Traces may include a single request tracking/monitoring process from creation to a returned result (or error). Every trace may be broken down into spans. A span may represent a unit of the amount of work (actual processes executed, etc.) along the lifecycle of a trace. Just as every data element has metadata, a trace's spans may contain naming labels, time stamps to measure its duration, status, and details of any associated events, etc.

Each application 502 may be instrumented with an OpenTelemetry instrumentation library 506. OpenTelemetry instrumentation library 506 may include the aforementioned types of telemetry data as source variables. Each application 502 may utilize its OpenTelemetry instrumentation library 506 to communicate with, for example, an OpenTelemetry collector. An OpenTelemetry collector may handle the collection, transformation, and distribution of all telemetric data to a monitoring/telemetry platform. OpenTelemetry collectors may include a receiver component that operates as a point of first contact with telemetry data and can be push or pull configured to determine the flow of data. Additionally, OpenTelemetry collectors may include a processor component that operates as a point through which data passes and can be analyzed or modified (filtering, cleaning, etc.) before being presented to any attached visualization tools. OpenTelemetry collectors may also include an exporter component that may operate as an endpoint before feeding data to an attached application or backend 510 (e.g., backend 1 510a, backend 2 510b, etc.) for analysis and/or presentation.

OpenTelemetry collectors may be deployed in a variety of models. For example, an OpenTelemetry collector may be deployed as an OpenTelemetry collector agent 508. OpenTelemetry collector agent 508 may operate as an agent that resides and/or executed on the same host 504 as the application 502 that it interfaces with. OpenTelemetry collector agent 508 may be configures as binary, DaemonSet, sidecar, etc.

In some embodiments, an OpenTelemetry collector may be deployed as an OpenTelemetry collector service 512. OpenTelemetry collector service 512 may be a standalone process that operates completely separately from application 502. OpenTelemetry collector service 512 may serve the role of a gateway that aggregates and exports data to the monitoring backend 510. Since OpenTelemetry collector service 512 may operate alongside application 502, it may allow application 502 to offload data quickly and can take care of additional handling like retries, batching, encryption, sensitive data filtering, etc. off of host 504.

OpenTelemetry collector agent 508 can send the telemetry data directly to backend 510. Alternatively, or additionally, OpenTelemetry collector agent 508 can send the telemetry data to backend 510 through OpenTelemetry collector service 512.

As noted above, throughput of the telemetry data with the OpenTelemetry involves utilizing multiple parallel hypertext transfer protocol (HTTP) connections. For example, telemetry data may be sent as multiple independent data streams utilizing parallel HTTP connections. This results in several drawbacks at the OpenTelemetry collector. For example, the setup overhead of each independent HTTP stream from an agent introduces additional latency, headers, bandwidth consumption, etc. In addition, HTTP/1 and HTTP/2 also have the drawback of head of line blocking when processing records, such that a line of telemetry data packets may be held up in a queue by a first packet introducing additional performance limitations to data communication using the OpenTelemetry protocol. As such, present methods of communicating telemetry data using the OpenTelemetry protocol achieve throughput by sacrificing performance, resiliency, bandwidth, and/or latency.

—Telemetry Over QUIC—

The techniques herein introduce a mechanism of extending telemetry data transport (e.g., extending OpenTelemetry transport) by leveraging QUIC multiplexing to improve overall performance, resiliency, bandwidth, latency, etc. In various embodiments, the techniques include proxying of legacy OpenTelemetry streams into independent channels within a single QUIC multiplexed session.

Illustratively, the techniques described herein may be performed by hardware, software, and/or firmware, such as in accordance with telemetry process 248, which may include computer executable instructions executed by the processor 220 (or independent processor of interfaces 210) to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

Operationally and according to various embodiments, the techniques herein provide a new method that improves the overall performance of OpenTelemetry data communication for both HTTP and gRPC methods via a new set of transports and/or proxying of legacy telemetry streams. This new method extends OpenTelemetry transport by introducing QUIC multiplexing to the protocol.

Figure 6:
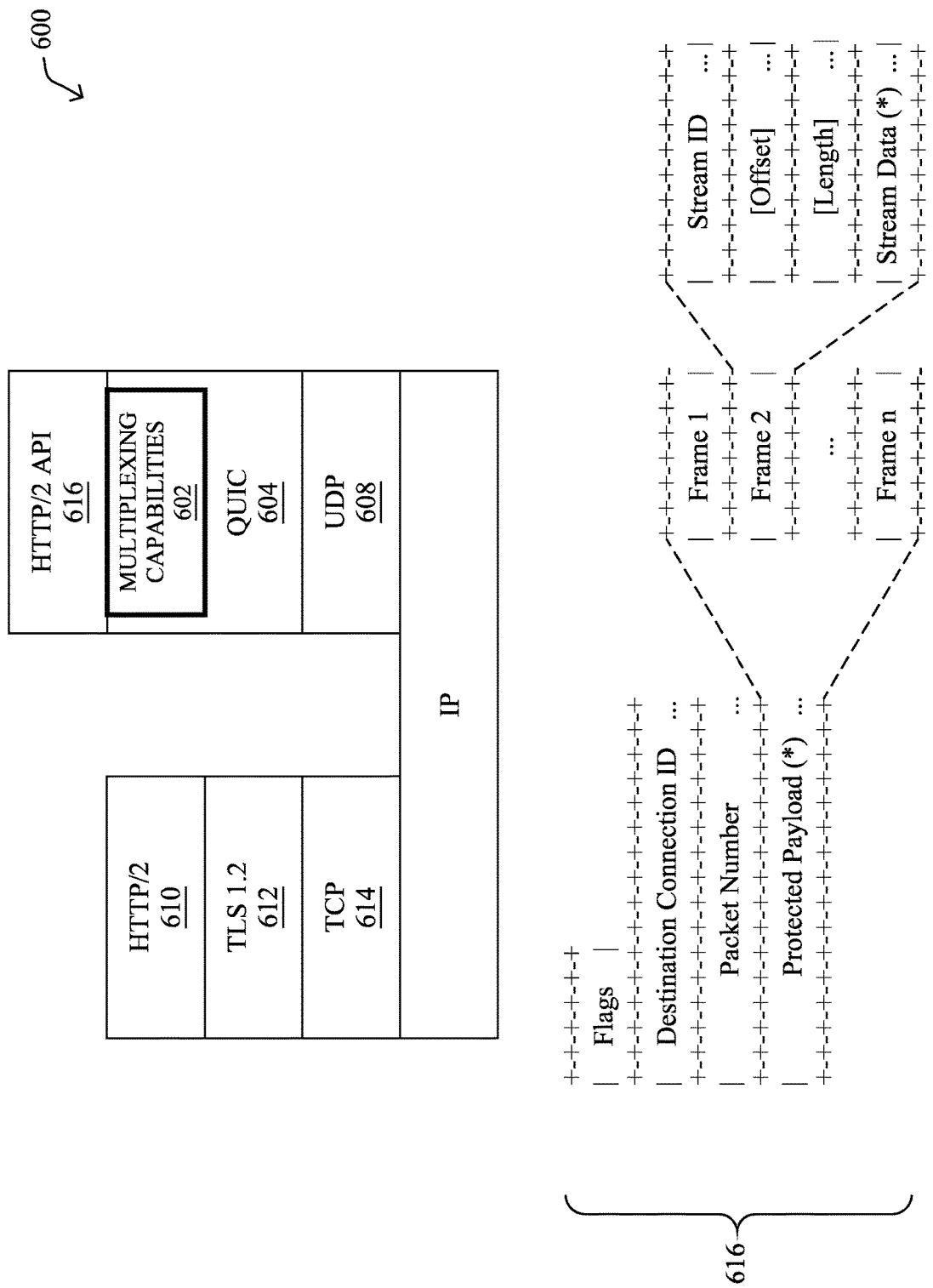
FIG. 6 illustrates an example of QUIC multiplexing capability utilizable within a protocol stack.

Specifically, as shown in FIG. 6, in one embodiment, QUIC multiplexing capability 602 (within a protocol stack 600) may be utilized to extend telemetry data communication protocols, such as OpenTelemetry, for telemetry data multiplexing, according to various embodiments. QUIC 604 protocol is a well-known multiplexed and secure transport protocol built atop user datagram protocol (UDP) 608. QUIC 604 shares some similarities with transmission control protocol (TCP) 614, transport layer security (TLS) 612 protocol, and HTTP/2 614, but is implemented on top of UDP 608. QUIC 604 offers improvements over TCP 614, TLS 612, and HTTP/2 614 including improved connection establishment latency, improved congestion control, multiplexing without head-of-line blocking, forward error correction, connection migration, etc. QUIC 604 fills the gap between transport layer UDP 608 protocol and application layer HTTP/2 616 protocol.

QUIC 604 transport layer may be utilized to communicate a QUIC packet 616. QUIC packet 616 may include a well-formed UDP payload that can be parsed by a QUIC receiver. QUIC packet 616 may provide richer information than TCP-based packets. For example, QUIC packet 616 may include a flag, a destination connection identifier, a packet number, and/or a protected payload. Each QUIC frame may include a stream identifier. The stream identifier may uniquely identify the QUIC stream of data. The stream identifier may be a variable-sized unsigned ID unique to that stream. A QUIC endpoint may not reuse a stream ID within a connection.

The least significant bit (0x01) of the stream ID may identify the initiator of the stream. Client-initiated streams have even-numbered stream IDs (with the bit set to 0), and server-initiated streams have odd-numbered stream IDs (with the bit set to 1). The second least significant bit (0x02) of the stream ID may distinguish between bidirectional streams (with the bit set to 0) and unidirectional streams (with the bit set to 1). The two least significant bits from a stream ID may therefore identify a stream as one of four types: 0x00 Client-Initiated/Bidirectional, 0x01 Server-Initiated/Bidirectional, 0x02 Client-Initiated/Unidirectional, and/or Server-Initiated/Unidirectional 0x03. The stream space for each type may begin at the minimum value (0x00 through 0x03, respectively); with successive streams of each type being created with numerically increasing stream IDs. Stream frames may encapsulate data sent by an application. An endpoint may use the Stream ID and/or Offset fields in the frames to place data in order.

As previously mentioned, HTTP/2 610 on TCP 614 can suffer from head of line blocking in TCP 614. Since HTTP/2 610 multiplexes many streams atop TCP's 614 single-byte stream abstraction, a loss of a TCP segment results in blocking of all subsequent segments until a retransmission arrives, irrespective of the HTTP/2 stream that is encapsulated in subsequent segments.

In contrast, QUIC 604 may include and/or utilize multiplexing capability 602. QUIC 604 is designed from the ground up for multiplexed operation, with multiplexing capability 602 allowing lost packets carrying data for an individual stream to generally only impact that specific stream. Each stream frame can be immediately dispatched to that stream on arrival, so streams without loss can continue to be reassembled and make forward progress in the application.

As such, utilizing QUIC 604, and more specifically the multiplexing capability 602 of QUIC 604, to transport telemetry data streams may produce efficient multiplexed communication of streams of OpenTelemetry telemetry data. In other words, in various embodiments each OpenTelemetry session may be multiplexed as a stream within a single QUIC-Multiplexed session. This aggregation may reduce overhead while significantly improving overall performance. Unfortunately, there are presently no existing mechanism to implement such a QUIC-Multiplexed session since OpenTelemetry is instead based on the aforementioned HTTP connections and are not configured to communicate via the QUIC protocol.

Figure 7:
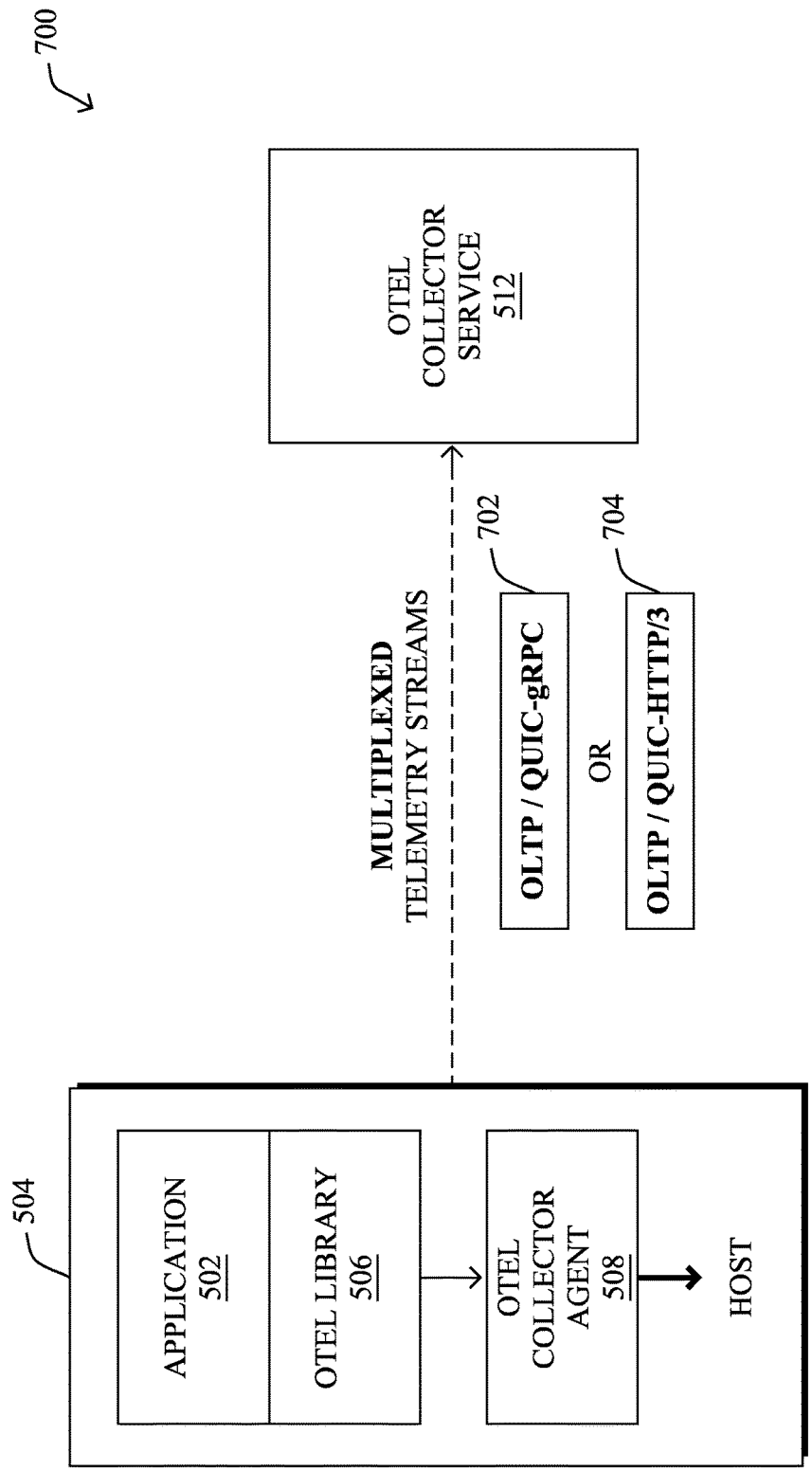
FIG. 7 illustrates an example of transport types for utilizing QUIC multiplexing to communicate multiplexed telemetry data streams.

FIG. 7 illustrates an example of transport types for utilizing QUIC multiplexing to communicate multiplexed telemetry data streams, according to various embodiments. The transport types may be utilized in an OpenTelemetry architecture 700. OpenTelemetry architecture 700 may include application 502 instrumented with OpenTelemetry instrumentation library 506 to facilitate communication with OpenTelemetry collector agent 508 executing on the same host 504 as application 502.

OpenTelemetry collector agent 508 may communicate telemetry data collected from application 502 to OpenTelemetry collector service 512. As opposed to traditional OpenTelemetry architectures where this communication is performed utilizing multiple parallel HTTP connections, OpenTelemetry architecture 700 may utilize new transport types configured to allow multiplexed communication of the telemetry data streams utilizing the QUIC protocol.

For example, agent (e.g., OpenTelemetry collector agent 508) and server (e.g., OpenTelemetry collector service 512) components may utilize an online transaction processing (OLTP)/QUIC-gRPC 702 transport type to communicate multiplexed telemetry streams. In such a system, agent and server may communicate via QUIC using gRPC using protocol buffers. That is, in contrast to the traditional HTTP protocol used in OpenTelemetry, where it not possible to send multiple requests or get multiple responses together in a single connection and a new connection will need to be created for each of them, OLTP/QUIC-gRPC 702 transport type may leverage the multiplexing capability of HTTP/2 to provide multiplexed telemetry streams. When utilizing OLTP/QUIC-gRPC 702, a non-HTTP port may be defined for this protocol.

Additionally, or alternatively, agent (e.g., OpenTelemetry collector agent 508) and server (e.g., OpenTelemetry collector service 512) components may utilize an OLTP/QUIC-HTTP/3 704 transport type to communicate multiplexed telemetry streams. Such a system may follow the same general model as is supported by current OpenTelemetry systems. However, unlike previous versions which relied on the well-established TCP, HTTP/3 uses the QUIC a multiplexed transport protocol built on UDP.

Therefore, by modifying the OpenTelemetry protocol to include OLTP/QUIC-gRPC 702 and/or OLTP/QUIC-HTTP/3 704 transport types, parallelization can be achieved utilizing the QUIC protocol. As such, multiple channels of telemetry data may be exchanged over a single transport by extending the OpenTelemetry protocol to leverage the QUIC protocol by the addition of these transport types.

Figure 8:
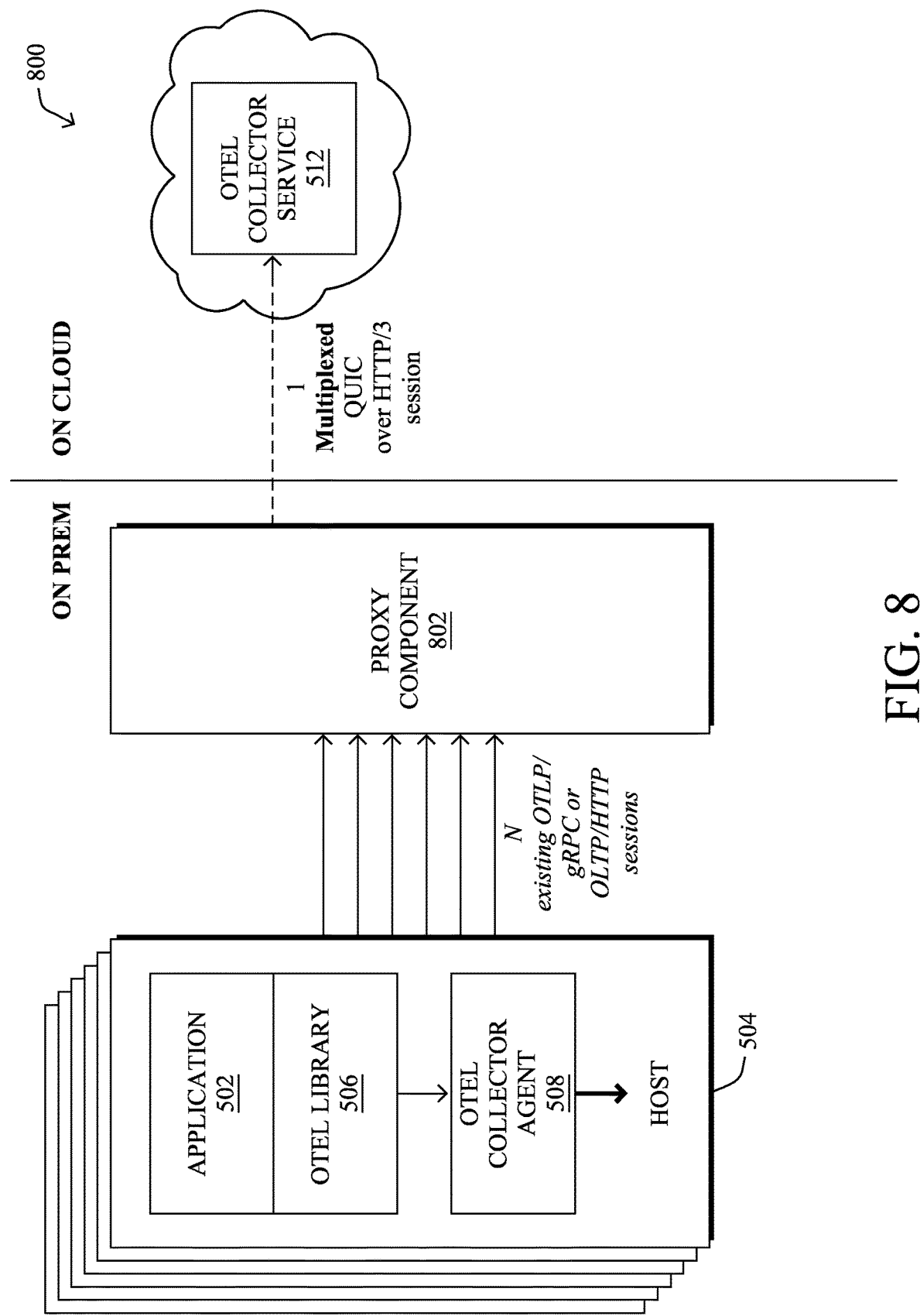
FIG. 8 illustrates an example of an architecture incorporating a proxy component to communicate multiplexed telemetry data streams utilizing QUIC multiplexing.

FIG. 8 illustrates an example of an architecture 800 incorporating a proxy component 802 to communicate multiplexed telemetry data streams utilizing QUIC multiplexing, according to various embodiments. Architecture 800 may include application 502 instrumented with OpenTelemetry instrumentation library 506 to facilitate communication with OpenTelemetry collector agent 508 executing on the same host 504 as application 502. OpenTelemetry collector agent 508 may be attempting to communicate telemetry data streams to OpenTelemetry collector service 512. In architecture 800, OpenTelemetry collector service 512 may be cloud-native while OpenTelemetry collector agent 508 may be located on a different network (e.g., on-premises) and the two may utilize an internet connection to exchange telemetry/observability data.

The telemetry data streams may "leave" OpenTelemetry collector agent 508 configured in the legacy protocol types of OpenTelemetry, such as OLTP/gRPC and/or OTLP/HTTP sessions. For example, multiple independent telemetry streams may be communicated as N OLTP/gRPC and/or OTLP/HTTP sessions from OpenTelemetry collector agents of one or more hosts to OpenTelemetry collector service 512.

However, rather than being communicated directly to OpenTelemetry collector service 512, proxy component 802 (e.g., an OpenTelemetry QUIC proxy) may aggregate the multiple independent telemetry streams. Proxy component 802 may perform a protocol translation to the aggregated multiple independent telemetry streams. For example, the aggregated multiple independent telemetry streams may be translated from their legacy OLTP/gRPC and/or OTLP/HTTP protocols to a QUIC protocol (e.g., convert to OTLP/QUIC-gRPC and/or OLTP/QUIC-HTTP/3 transport types).

Additionally, according to the techniques herein, proxy component 802 may map each flow into an independent QUIC channel. For example, proxy component 802 may map the span identifier of each of the independent telemetry streams to a respective stream identifier that uniquely identifies a QUIC channel of a multiplexed QUIC protocol stream. This approach may convert those independent connections to a multiplexed QUIC session so that each independent connection of the legacy protocol type becomes as stream (e.g., a channel) within a single QUIC multiplexed session. In some examples, each channel of a multiplexed QUIC protocol session may be dedicated to a respective independent telemetry stream.

Of note, multiplexing is not an automatic functionality of QUIC. Also, the OpenTelemetry protocol does not inherently possess a schema to utilize the multiplexing capabilities of QUIC. In contrast, the OpenTelemetry protocol prescribes parallel independent OpenTelemetry connections for throughput. The newly disclosed operations of proxy component 802 may provide mechanisms for performing the mapping techniques and setting up the multiplexing channels that enable the placement of each independent OpenTelemetry stream and the multiplexing of the streams into an associated unique QUIC channel within a single QUIC connection for communication. Conversely, if the OpenTelemetry protocol simply added OpenTelemetry over HTTP/3 or over QUIC without incorporating proxy component 802, it would not yield automatic multiplexing but rather a single stream in HTTP/3 or QUIC.

Therefore, aggregating and/or accumulating disparate OpenTelemetry streams into a single flow connection destined for OpenTelemetry collector service 512 utilizing the multiplexing capabilities of QUIC may substantially improve performance and/or scale as compared with the independent legacy OpenTelemetry connections and even when compared with a QUIC transport not utilizing multiplexing, especially when the OpenTelemetry collector service 512 resides on a separate network (e.g., a cloud connector). These improvements may be realized through the proxy conversion technique and/or the OpenTelemetry protocol translation that combine and translate independent/disparate (legacy) OpenTelemetry protocol streams into unique channels within the new, single QUIC multiplexed connection.

The transmuted and/or multiplexed set of OpenTelemetry streams into a single QUIC connection may then be sent to an upstream next-generation OpenTelemetry collector service 512 as a multiplexed QUIC over an HTTP/3 session. The retrieving device (e.g., OpenTelemetry collector service 512) may determine, for each stream (channel) within a single QUIC multiplexed session, the associated span identifier of the independent telemetry stream whence it originated. The retrieving device may make this determination by referencing the respective stream identifier of that stream to the mappings between span identifiers and stream identifiers. As such, the mapping produced by proxy component 802 may provide a mechanism by which the identifying information associated with each of the independent telemetry streams can be tracked and/or determined through its translation from legacy sessions and its multiplexed communication through a channel of a multiplexed QUIC session.

Proxy component 802 may be deployed in a variety of forms. For example, proxy component 802 may be deployed as a same host Daemon. For example, a Daemon may be utilized to aggregate disparate OpenTelemetry connections emanating from the individual processes on host 504 into a single QUIC session. Additionally, proxy component 802 may be deployed as a side car proxy. In such examples, a side car proxy container may be utilized to aggregate disparate OpenTelemetry connections emanating from individual containers into a single QUIC session. Proxy component 802 may also be deployed as a router or server proxy (e.g., off box). In such examples, a separate router or server node proxy may be utilized to aggregate disparate OpenTelemetry connections emanating from individual hosts into a single QUIC session.

Figure 9:
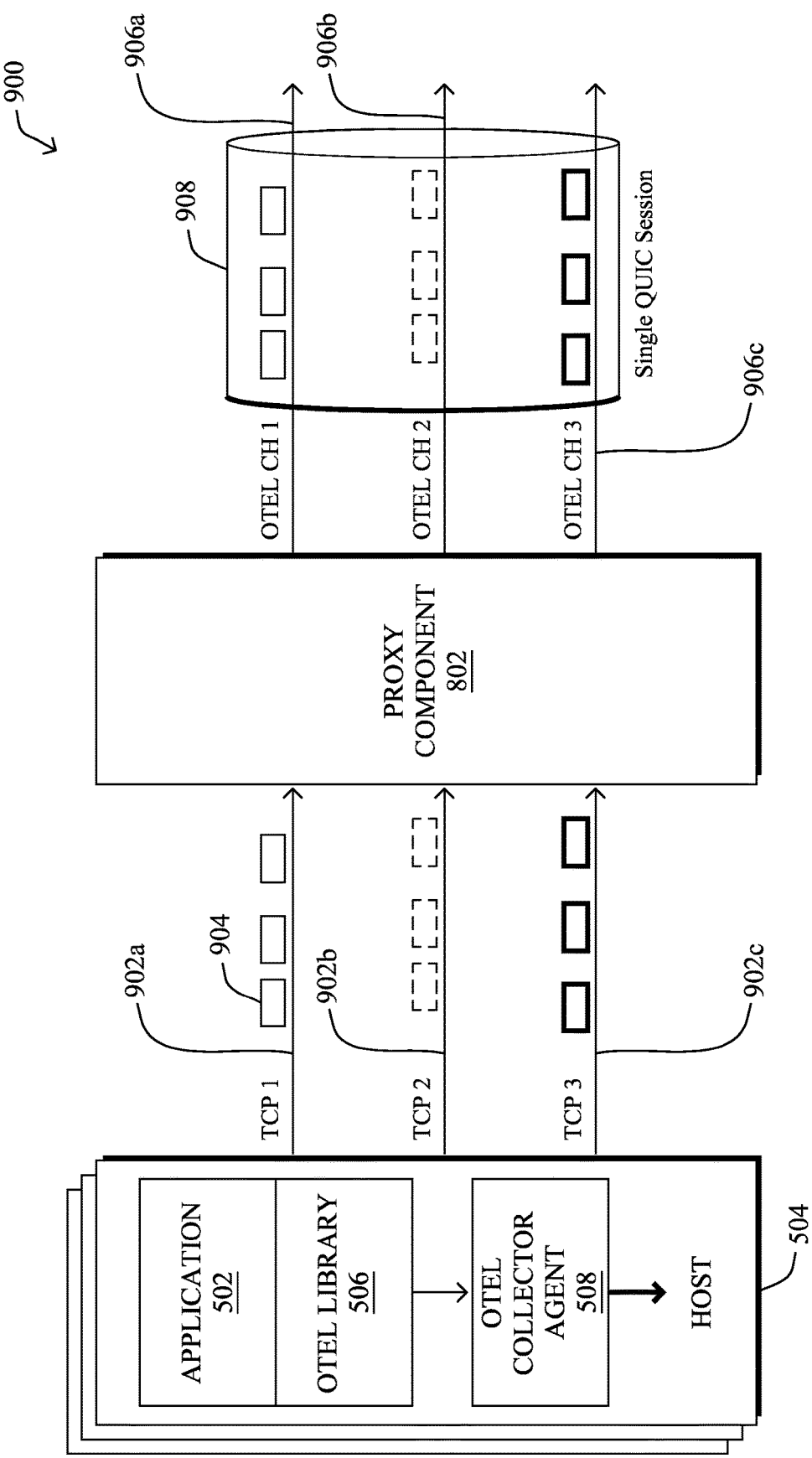
FIG. 9 illustrates an example of a proxy flow of a proxy component communicating multiplexed telemetry data streams utilizing QUIC multiplexing.

FIG. 9 illustrates an example of a proxy flow 900 of a proxy component 802 communicating multiplexed telemetry data streams utilizing QUIC multiplexing, according to various embodiments. Proxy flow 900 may include application 502 instrumented with OpenTelemetry instrumentation library 506 to facilitate communication with OpenTelemetry collector agent 508 executing on the same host 504 as application 502. OpenTelemetry collector agent 508 may be attempting to communicate telemetry data streams to OpenTelemetry collector service and/or directly to a back-end.

OpenTelemetry collector agent 508 may be communicating the telemetry data as multiple independent telemetry streams 902 each including packets 904 of telemetry data. Each of the multiple independent telemetry streams 902 may be communicated as a disparate legacy (OLTP/gRPC session, OTLP/HTTP session, etc.) OpenTelemetry connection.

The legacy OpenTelemetry connections may be terminated at proxy component 802. The multiple independent telemetry streams 902 may be translated, by proxy component 802, into a unique channel 906 within a single QUIC session 908 of the newly described OpenTelemetry/QUIC protocol. In topologies where the telemetry (e.g., OpenTelemetry) producers (e.g., application 502, etc.) run on a different network than the OpenTelemetry telemetry data collector, such as a Cloud-Native hyperscaler network (AWS, etc.), a significant performance advantage of fewer connection setups, latency, and flow overhead may be realized.

Figure 10:
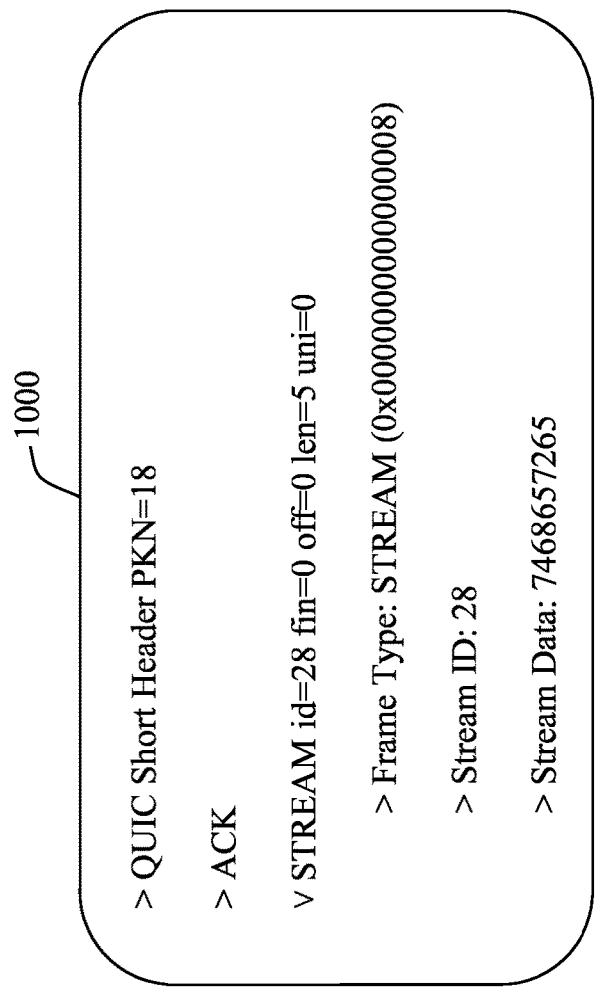
FIG. 10 illustrates an example of a packet capture of a legacy OpenTelemetry stream proxied into a channel within a single QUIC session.

FIG. 10 illustrates an example of a packet capture 1000 of a legacy OpenTelemetry stream proxied into a channel within a single QUIC session, according to various embodiments. Each QUIC stream may be identified by a unique stream identifier. For example, in packet capture 1000, the single QUIC session may be associated with the stream identifier of Stream ID 28. The two least significant bits of the stream identifier may be utilized to identify which endpoint initiated the stream and whether the stream is bidirectional or unidirectional.

Each stream may resemble a TCP connection, providing ordered byte-stream delivery. As such, each legacy OpenTelemetry connection may be multiplexed into a QUIC stream. Aggregating all of the independent legacy OpenTelemetry connections into a single QUIC session via the newly proposed OpenTelemetry protocol may provide the significant benefits of reduced latency (see 0-RTT in QUIC), better throughput using multiplexing and less session setup overhead (e.g., one vs. many).

Figure 11:
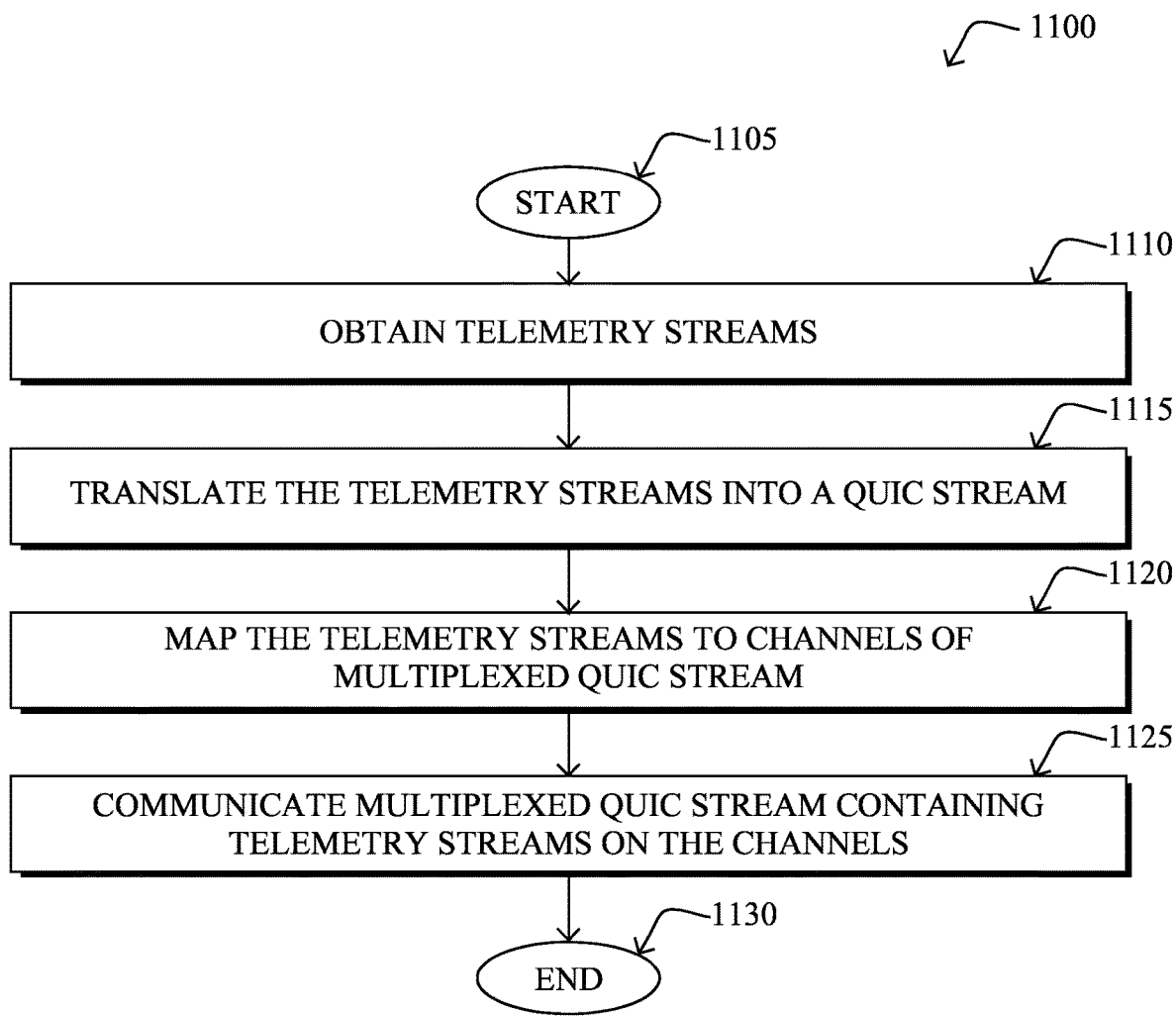
FIG. 11 illustrates an example simplified procedure for correlating object state changes with application performance in accordance with one or more embodiments described herein.

In closing, FIG. 11 illustrates an example simplified procedure 1100 for communicating telemetry data over QUIC in accordance with one or more embodiments described herein, particularly from the perspective of a proxy component for communicating data over QUIC. For example, a non-generic, specifically configured device (e.g., device 200) may perform procedure 1100 by executing stored instructions (e.g., telemetry process 248). The procedure 1100 may start at step 1105, and continues to step 1110, where, as described in greater detail above, a device may obtain one or more independent telemetry streams. Each of the one or more independent telemetry streams may be uniquely identifiable by a span identifier. Each of the one or more independent telemetry streams may be an OpenTelemetry stream. Further, the one or more independent telemetry streams may provide ordered byte-stream delivery.

In various embodiments, the one or more independent telemetry streams may be OpenTelemetry hypertext transfer protocol streams. For example, the one or more independent telemetry streams may be communicated as an OpenTelemetry HTTP/1 and/or HTTP/2 connections. In some embodiments, the one or more independent telemetry streams are OpenTelemetry gRPC streams.

The one or more independent telemetry streams may emanate from individual processes on a host and be aggregated by a daemon, may emanate from individual containers and be aggregated by a side car proxy container, and/or emanate from individual hosts and be aggregated by a router or server node proxy. The one or more independent telemetry streams may be collected from an application on a first network and the retrieving device may be located on a second network.

In step 1115, the device may translate each of the one or more independent telemetry streams into a corresponding QUIC protocol stream. The one or more independent telemetry streams may be terminated at the device. For example, the one or more independent telemetry streams in their legacy format may be terminated at the device with the translated versions being those telemetry streams being communicated on to a collector node.

In step 1120, the device may map the span identifier of each of the one or more independent telemetry streams to a respective stream identifier that uniquely identifies a QUIC channel of a multiplexed QUIC protocol stream. Each stream identifier may include an identification of an endpoint that initiated a corresponding independent telemetry stream. For example, the stream identifier may identify the application and/or collector agent where the corresponding independent telemetry stream originated. Further, each stream identifier may include an identification of whether a corresponding independent telemetry stream is bidirectional or unidirectional.

In step 1125, the device may communicate, the multiplexed QUIC protocol stream containing each of the one or more independent telemetry streams on its corresponding QUIC channel to cause a retrieving device to determine the span identifier of each of the one or more independent telemetry streams based on their respective stream identifier. In various embodiments, the retrieving device may be an OpenTelemetry collector node.

The multiplexed QUIC protocol stream may exchange each of the one or more independent telemetry streams in parallel. For example, communicating the multiplexed QUIC protocol stream may include exchanging translated independent telemetry streams in parallel across a plurality of QUIC channels in a single QUIC multiplexed session.

In various embodiments, the multiplexed QUIC protocol stream may communicate each of the one or more independent telemetry streams using a gRPC protocol buffer. In such examples, a non-hypertext transfer protocol port may be defined for communicating the multiplexed QUIC protocol stream of each of the one or more independent telemetry streams using the gRPC protocol buffer. Alternatively, or additionally, the multiplexed QUIC protocol stream may communicate each of the one or more independent telemetry streams using a hypertext transfer protocol. For example, the multiplexed QUIC protocol stream may communicate each of the one or more independent telemetry streams using an HTTP/3 connection.

The simplified procedure 1100 may then end in step 1130, notably with the ability to continue obtaining, translating, mapping, and/or communicating subsequent telemetry streams, accordingly. Other steps may also be included generally within procedure 1100. For example, such steps (or, more generally, such additions to steps already specifically illustrated above), may include other techniques and/or other specific embodiments as described herein.

Figure 12:
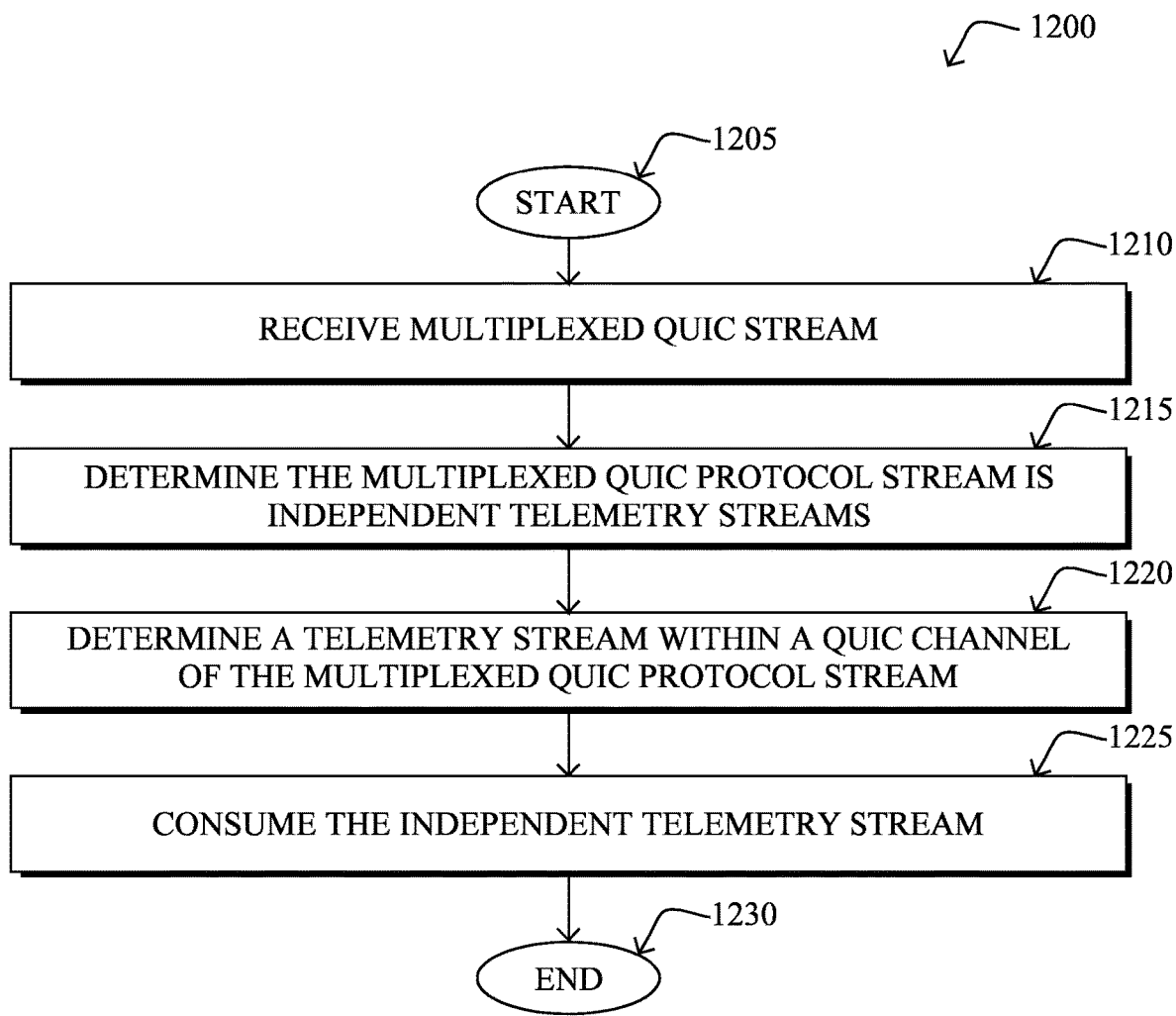
FIG. 12 illustrates an example simplified procedure for receiving telemetry data over QUIC.

In addition, FIG. 12 illustrates an example simplified procedure 1200 for receiving telemetry data over QUIC in accordance with one or more embodiments described herein, particularly from the perspective of a retrieving device such as an OpenTelemetry collector service, a back-end, a server, etc. For example, a non-generic, specifically configured device (e.g., device 200) may perform procedure 1200 by executing stored instructions (e.g., telemetry process 248). The procedure 1200 may start at step 1205, and continues to step 1210, where a retrieving device may receive a multiplexed QUIC protocol stream. The QUIC protocol stream may be made up of a plurality of QUIC channels.

In step 1215, the retrieving device may determine that the multiplexed QUIC protocol stream is a communication of independent telemetry streams. For example, the retrieving device may determine that the multiplexed QUIC protocol stream includes one or more OpenTelemetry telemetry streams multiplexed into corresponding channels of a single multiplexed QUIC protocol stream.

In step 1220, the retrieving device may determine an independent telemetry stream communicated within a QUIC channel of the multiplexed QUIC protocol stream. This determination may be based on correlation between a respective stream identifier of each of the plurality of QUIC channels and a span identifier of a corresponding independent telemetry stream. For example, the determination may be based on the mapping of the span identifier of the telemetry stream to the stream identifier of the channel as specified in the frames being communicated within the channel.

In step 1225, the retrieving device may consume the independent telemetry stream with its span identifier. For example, the retrieving device may process the frames of the independent telemetry stream within their respective channel of the multiplexed QUIC protocol stream along with their span identifier specified within the frames. In this manner, the retrieving device may process each of a plurality of independent telemetry streams sent in parallel across individual channels of the multiplexed QUIC protocol stream while retaining the identity of the telemetry stream which originated and was originally communicated outside of the QUIC protocol.

The simplified procedure 1200 may then end in step 1230, notably with the ability to continue receiving subsequent multiplexed QUIC protocol streams having a plurality of QUIC channels, determining those streams are communications of independent telemetry streams, determining an independent telemetry stream communicated within each QUIC channel of the subsequent multiplexed QUIC protocol stream, and/or consuming those streams with their span identifiers, accordingly. Other steps may also be included generally within procedure 1200. For example, such steps (or, more generally, such additions to steps already specifically illustrated above), may include other techniques and/or other specific embodiments as described herein.

It should be noted that while certain steps within procedures 1100-1200 may be optional as described above, the steps shown in FIGS. 11-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while the procedure 1100 and 1200 are described separately, certain steps from each procedure may be incorporated into each other procedure, and the procedures are not meant to be mutually exclusive.

The techniques described herein, therefore, provide for communicating telemetry data over QUIC connections. For instance, the techniques provide for aggregation of independent legacy OpenTelemetry connections into a single QUIC session via the newly proposed expansion of the OpenTelemetry protocol. Further, by translating legacy OpenTelemetry connections and communicating them in parallel across respective channels of a single Multiplexed QUIC session, scale and performance of OpenTelemetry communications of telemetry data may be improved and head of line blocking concerns may be ameliorated. For example, by expanding the OpenTelemetry protocol to include aggregating multiple independent legacy OpenTelemetry connections into a single QUIC session may provide significant benefits (even when compared to a QUIC transport not using multiplexing), of reduced latency (see 0-RTT in QUIC), better throughput using multiplexing and less session setup overhead (e.g., one vs. many).

According to the embodiments herein, an illustrative method herein may comprise: obtaining, by a device, one or more independent telemetry streams, wherein each of the one or more independent telemetry streams is uniquely identifiable by a span identifier; translating, by the device, each of the one or more independent telemetry streams into a corresponding QUIC protocol stream; mapping, by the device, the span identifier of each of the one or more independent telemetry streams to a respective stream identifier that uniquely identifies a QUIC channel of a multiplexed QUIC protocol stream; and communicating, by the device, the multiplexed QUIC protocol stream containing each of the one or more independent telemetry streams on its corresponding QUIC channel to cause a retrieving device to determine the span identifier of each of the one or more independent telemetry streams based on their respective stream identifier.

In one embodiment, the one or more independent telemetry streams emanate from individual processes on a host and are aggregated by a daemon. In one embodiment, the one or more independent telemetry streams emanate from individual containers and are aggregated by a side car proxy container. In one embodiment, the one or more independent telemetry streams emanate from individual hosts and are aggregated by a router or server node proxy. In one embodiment, the one or more independent telemetry streams are OpenTelemetry hypertext transfer protocol streams. In one embodiment, the one or more independent telemetry streams are OpenTelemetry gRPC streams. In one embodiment, the retrieving device is an OpenTelemetry collector node. In one embodiment, the one or more independent telemetry streams are collected from an application on a first network and wherein the retrieving device is on a second network. In one embodiment, the multiplexed QUIC protocol stream exchanges each of the one or more independent telemetry streams in parallel.

In one embodiment, the multiplexed QUIC protocol stream communicates each of the one or more independent telemetry streams using a gRPC protocol buffer. In one embodiment, the method further comprises defining a non-hypertext transfer protocol (non-HTTP) port for communicating the multiplexed QUIC protocol stream of each of the one or more independent telemetry streams using the gRPC protocol buffer. In one embodiment, the multiplexed QUIC protocol stream communicates each of the one or more independent telemetry streams using a hypertext transfer protocol. In one embodiment, each of the one or more independent telemetry streams is an OpenTelemetry stream. In one embodiment, the one or more independent telemetry streams are terminated at the device. In one embodiment, each stream identifier includes an identification of an endpoint that initiated a corresponding independent telemetry stream. In one embodiment, each stream identifier includes an identification of whether a corresponding independent telemetry stream is bidirectional or unidirectional. In one embodiment, the one or more independent telemetry streams provide ordered byte-stream delivery.

According to the embodiments herein, an illustrative tangible, non-transitory, computer-readable medium herein may have computer-executable instructions stored thereon that, when executed by a processor on a computer, may cause the computer to perform a method comprising: obtaining one or more independent telemetry streams, wherein each of the one or more independent telemetry streams is uniquely identifiable by a span identifier; translating each of the one or more independent telemetry streams into a corresponding QUIC protocol stream; mapping the span identifier of each of the one or more independent telemetry streams to a respective stream identifier that uniquely identifies a QUIC channel of a multiplexed QUIC protocol stream; and communicating the multiplexed QUIC protocol stream containing each of the one or more independent telemetry streams on its corresponding QUIC channel to cause a retrieving device to determine the span identifier of each of the one or more independent telemetry streams based on their respective stream identifier.

In one embodiment, communicating the multiplexed QUIC protocol stream further comprises exchanging translated independent telemetry streams in parallel across a plurality of QUIC channels in a single QUIC multiplexed session.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: obtain one or more independent telemetry streams, wherein each of the one or more independent telemetry streams is uniquely identifiable by a span identifier; translate each of the one or more independent telemetry streams into a corresponding QUIC protocol stream; map the span identifier of each of the one or more independent telemetry streams to a respective stream identifier that uniquely identifies a QUIC channel of a multiplexed QUIC protocol stream; and communicate the multiplexed QUIC protocol stream containing each of the one or more independent telemetry streams on its corresponding QUIC channel to cause a retrieving device to determine the span identifier of each of the one or more independent telemetry streams based on their respective stream identifier.

Furthermore, according to the embodiments herein, an illustrative method herein may comprise: receiving, by a retrieving device, a multiplexed QUIC protocol stream having a plurality of QUIC channels; determining, by the retrieving device, that the multiplexed QUIC protocol stream is a communication of independent telemetry streams; determining, by the retrieving device and based on a correlation between a respective stream identifier of each of the plurality of QUIC channels and a span identifier of a corresponding independent telemetry stream, an independent telemetry stream communicated within a QUIC channel of the multiplexed QUIC protocol stream; and consuming, by the retrieving device, the independent telemetry stream with its span identifier.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by an engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   obtaining, by a device, a plurality of independent telemetry streams, wherein each of the plurality of independent telemetry streams is uniquely identifiable by a span identifier;
   translating, by the device, each of the plurality of independent telemetry streams into a corresponding QUIC protocol stream;
   mapping, by the device, the span identifier of each of the plurality of independent telemetry streams to a respective stream identifier that uniquely identifies a QUIC channel of a multiplexed QUIC protocol stream; and
   communicating, by the device, the multiplexed QUIC protocol stream containing each of the plurality of independent telemetry streams on a corresponding QUIC channel to cause a retrieving device to determine the span identifier of each of the plurality of independent telemetry streams based on the respective stream identifier associated with the corresponding QUIC channel.

2. The method as in claim 1, wherein the plurality of independent telemetry streams emanate from individual processes on a host and are aggregated by a daemon.

3. The method as in claim 1, wherein the plurality of independent telemetry streams emanate from individual containers and are aggregated by a side car proxy container.

4. The method as in claim 1, wherein the plurality of independent telemetry streams emanate from individual hosts and are aggregated by a router or server node proxy.

5. The method as in claim 1, wherein the plurality of independent telemetry streams are OpenTelemetry hypertext transfer protocol streams.

6. The method as in claim 1, wherein the plurality of independent telemetry streams are OpenTelemetry gRPC streams.

7. The method as in claim 1, wherein the retrieving device is an OpenTelemetry collector node.

8. The method as in claim 1, wherein the plurality of independent telemetry streams are collected from an application on a first network and wherein the retrieving device is on a second network.

9. The method as in claim 1, wherein the multiplexed QUIC protocol stream exchanges each of the plurality of independent telemetry streams in parallel.

10. The method as in claim 1, wherein the multiplexed QUIC protocol stream communicates each of the plurality of independent telemetry streams using a gRPC protocol buffer.

11. The method as in claim 10, further comprising:
    defining a non-hypertext transfer protocol port for communicating the multiplexed QUIC protocol stream of each of the plurality of independent telemetry streams using the gRPC protocol buffer.

12. The method as in claim 1, wherein the multiplexed QUIC protocol stream communicates each of the plurality of independent telemetry streams using a hypertext transfer protocol.

13. The method as in claim 1, wherein each of the plurality of independent telemetry streams is an OpenTelemetry stream.

14. The method as in claim 1, wherein the plurality of independent telemetry streams are terminated at the device.

15. The method as in claim 1, wherein each stream identifier includes an identification of an endpoint that initiated a corresponding independent telemetry stream.

16. The method as in claim 1, wherein each stream identifier includes an identification of whether a corresponding independent telemetry stream is bidirectional or unidirectional.

17. The method as in claim 1, wherein the plurality of independent telemetry streams provide ordered byte-stream delivery.

18. A tangible, non-transitory, computer-readable medium having computer-executable instructions stored thereon that, when executed by a processor on a computer, cause the computer to perform a method comprising:
    obtaining a plurality of independent telemetry streams, wherein each of the plurality of independent telemetry streams is uniquely identifiable by a span identifier;
    translating each of the plurality of independent telemetry streams into a corresponding QUIC protocol stream;
    mapping the span identifier of each of the one or more plurality of independent telemetry streams to a respective stream identifier that uniquely identifies a QUIC channel of a multiplexed QUIC protocol stream; and
    communicating the multiplexed QUIC protocol stream containing each of the plurality of independent telemetry streams on a corresponding QUIC channel to cause a retrieving device to determine the span identifier of each of the plurality of independent telemetry streams based on the respective stream identifier associated with the corresponding QUIC channel.

19. The tangible, non-transitory, computer-readable medium as in claim 18, wherein communicating the multiplexed QUIC protocol stream further comprises:
    exchanging translated independent telemetry streams in parallel across a plurality of QUIC channels in a single QUIC multiplexed session.

* * * * *

UNITED STATES PATENT AND TRADEMARK OFFICE
CERTIFICATE OF CORRECTION

PATENT NO. : 12,166,825 B2
APPLICATION NO. : 17/895368
DATED : December 10, 2024
INVENTOR(S) : Vincent E. Parla et al.

Page 1 of 1

It is certified that error appears in the above-identified patent and that said Letters Patent is hereby corrected as shown below:

In the Claims

Column 24, Line 36 please amend as shown:
mapping the span identifier of each of the Signed and Sealed this
Eleventh Day of March, 2025

Coke Morgan Stewart
*Acting Director of the United States Patent and Trademark Office*